April 27, 1954  H. W. KINDLEY  2,676,811
TOOL HANDLE
Filed Sept. 22, 1950

INVENTOR.
Howard W. Kindley
BY
Atty.

Patented Apr. 27, 1954

2,676,811

UNITED STATES PATENT OFFICE 2,676,811

TOOL HANDLE

Howard W. Kindley, Portland, Oreg., assignor to Speed Corporation, Portland, Oreg., a corporation of Oregon Application September 22, 1950, Serial No. 186,208

8 Claims. (Cl. 279—53)

This invention relates to a hollow tool handle having two movable jaws which are adapted, interchangeably, to grip and hold drills, reamers, files, awls, hacksaw and razor blades, screwdrivers, chisels, and the like.

One object of my invention is to provide, in combination with a tool handle, a pair of channel-shaped jaw members having a portion of the flanges thereof expanded and turned in to abut one another and define a truncated pyramid shape for imparting structural strength to that jaw portion which is subject to the greatest distortion and strain.

The typical modern tool handle or holder is the mass production product of a manufacturer engaged in a highly competitive business. One such handle with which many mechanics are familiar includes a hollow wooden handle which carries two mated jaw members arranged selectively to grip and release, therebetween, any of a variety of tools. The most popular and practical actuation means therefore appears to be a reciprocable threaded sleeve and screw. To close the jaw members, the actuating screw is rotated, moving the sleeve longitudinally. The sleeve, in turn, grips the jaws and pulls them down into the hollow handle. As the jaws enter the handle, they ride over cam surfaces which cooperate with follower surfaces carried by the jaws proper. This cam action forces the jaws toward one another into a gripping position. When it is desired to loosen the jaws, the actuating screw is reversely rotated, moving the sleeve in the opposite direction, and the jaws are left free to be separated.

It is at this point that I have discovered two disadvantages to be inherent in the use of the described type tool handle. The first of these disadvantages concerns the relaxation in gripping of the jaw members, as the sleeve backs off to free the follower surfaces from the cam action. The conventional tool handle jaws do not separate positively but, rather, must be separated manually if another tool is to be inserted therebetween. Thus, the operation of the conventional device requires the use of both hands to prepare the jaws for further use. One advantage of my invention is that this operation can be performed with one hand, thereby leaving the other hand free to grasp and insert a new tool.

The second inherent disadvantage concerns the structural strength of the gripping and cam action portions of the jaw. These portions, which are subject to the maximum distortion and strain, are often made of flat sheet stock or are made of sheet stock which is curved somewhat to fit the interior of the hollow handle. I have found such jaws to be impractical in that they have a short life due to their structural strength deficiencies. Such deficiencies reflect unfavorably upon the product of the manufacturer. In a highly competitive business, he can ill afford consumer dissatisfaction. Accordingly, I have sought to overcome these deficiencies and to obviate such dissatisfaction by forming the jaws of my tool handle from channel stock having flanges which traverse substantially the entire length of the gripping portion of each jaw. Furthermore, I have expanded these flanges at those points receiving the maximum stress and strain. The expanded flanges are also turned in to abut one another along the margins thereof and define a truncated pyramid shape possessing superior strength. Such a shape, however, is also possessed of a second utility in that I have correlated the shape of my cam recess portions thereto. Thus, when the jaw members are moved to a gripping position, the truncated pyramid (that is, the tapered sides thereof) serves to center each jaw in the correlated recess portion and to insure an efficient and tight gripping action.

A further object of my invention is to spring bias the jaw members of a tool handle to assume the release position, thus allowing tools to be interchanged easily, thus requiring the use of but one hand to operate the mechanism.

Another object of my invention is to doubletaper the terminal ends of two mated tool handle jaws and to taper the cam operating recesses accordingly, whereby a sure and efficient grip is effected each and every time the jaws are set due to the self-centering properties and design of such correlated tapers.

These and other objects and advantages of my invention will be set forth in the following detailed description and with reference to the accompanying drawing, wherein.

Figure 3:
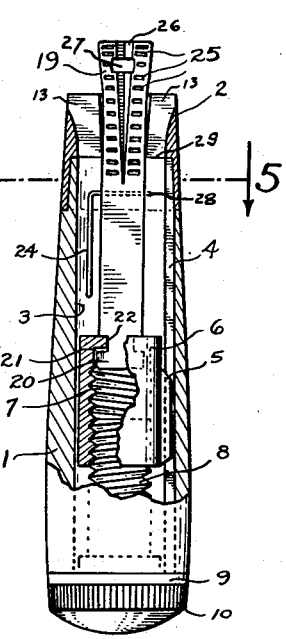
Fig. 3 is a side view, also partially broken away and taken at right angles to Fig. 2 substantially on the line 3—3 of Fig. 1, showing the bias spring and gripping face for my jaw members.
Figure 4:
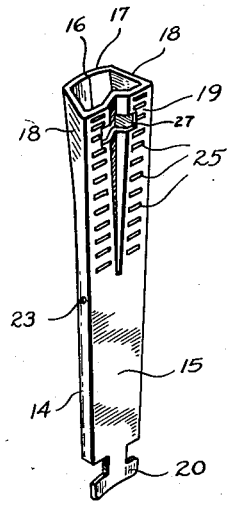
Figure 5:
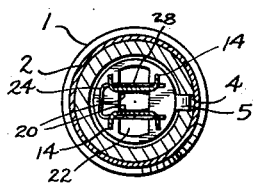

Fig. 4 is a perspective view of one jaw member more particularly indicating the manner in which the spring is secured to the flanges thereof and manner in which the channel construction thereof carries expanded flanges which are turned in to abut one another and define a truncated pyramid shape; and Fig. 5 is a section view, taken substantially on the line 5—5 of Fig. 3, showing the manner in which the channel shaped jaw members fit within the hollow handle and cooperate with the bias spring therefor.

The device embodying my invention includes a hollow wooden handle portion 1 carrying a ferrule 2 which is force fitted about the periphery at one end thereof. Within the bore 3 of the wooden handle, a longitudinal keyway 4 is cut. This keyway slidably carries the key 5 formed on the sleeve 6. The interior of the sleeve 6 is tapped with threads 7 to cooperate with similar threads 8 carried by an actuating screw 9. In turn, the head of the actuating screw 9 is serrated, as at 10, and carries the slot 11 adapted to accommodate the head of a screw driver when added leverage is desired. Since the actuating screw 9 is free to rotate separate from the wooden handle 1, the cooperating threads 7 and 8 cause the sleeve 6 to ride up and down within the handle, guided by the key 5.

The top of the ferrule 2 carries two identical tapered recess portions 12 which define cam faces. At right angles to these recess portions, the ferrule 2 carries two slots 13 which are open to the periphery thereof in order to accommodate the wide shank of a tool such as the width of a razor blade, etc.

As best shown in Fig. 4, each of the channel section jaw members carry two flanges 14 joined by a web 15. The flanges 14 run substantially the entire length of the jaw member to add strength thereto. At the terminal end of each channel section, the flanges 14 are expanded and turned in to abut one another as at 16 and thereby define a truncated pyramid shape having a back or cam follower wall 17, tapered sidewalls 18, and a front or gripping face 19. It is this truncated pyramid shape which imparts structural strength to that critical jaw portion which is subject to the most severe wear and strain.

The lower end of each jaw member carries a transversely curved T-portion 20 adapted to fit within the complementary notch 21 formed in the upper end of the sleeve 6. The notch 21 receives the T-portion 20 through a slot 22 formed in the sleeve 6. Thus, when the jaw members are to be assembled within the sleeve 6, they are inserted through the slot 22 and turned 90° so the T-portions 20 rest in the notch 21.

Intermediate the ends of each channel section jaw member, I have pierced the flanges 14 with aligned holes 23. These holes, in pairs, receive the shank 28 of a U-shaped bent wire compression spring 24 for biasing the jaws toward a release or opened position. Accordingly, when the actuating screw 9 is backed off, the spring 24 causes the jaw members to separate and allows tools to be interchanged easily and require the use of but one hand.

In Fig. 4, I have shown how the front or gripping face 19 of each jaw member is roughened as by notches or serrations 25. Furthermore, each gripping face is grooved as at 26 to accommodate the shank of a tool, such as a file. Adjacent the top of the gripping face 19, I prefer to form a screw gripping opening 27. This opening accommodates the head of a screw when my tool handle is used as a screw driver and the shank of the screw rides in the terminal end of the groove 26. My tool handle is adapted thereby to interchangeably accommodate a maximum of varying sized tools, blades, screws, etc.

Returning now to the tapered or truncated pyramid shape of the terminal end of each jaw member, it will be noted that both the side walls 18 and the back wall 17 are tapered. This has been done to correlate the shape of each jaw member with the shape of the corresponding recessed portion 12 formed in the ferrule 2. Such a correlation of tapers gives a self-centering action to the jaw members as they are moved to the gripping position. Furthermore, the abutment of the margins of the expanded flanges 14, as at 16, adds strength to each jaw member and provides a plane cam follower face 17 having a large area for coacting with the corresponding cam recess portion 12. The large area of such a cam follower face is of decided utility in prolonging the life of my tool handle and tends to reflect credit upon the manufacturer.

In operation, the tool handle is assembled by inserting the T-portions 20 into the slot 22 and turning the two jaws 90° so the T-portions rest in the notch 21. The spring 24, of course, will then bias the jaws to release position. Thereafter, if a tool, blade, or screw is to be engaged, as for example the head of a wood screw, it is placed in position with the shank resting in the grooves 26 and the head within the openings 27. Thereafter, the actuating screw 9 is rotated causing the sleeve 6 to ride down into the hollow handle as guided by the keyway 4 and key 5. Such action forces the jaws together in gripping relationship due to the coaction of the cam recesses 12 and cam follower back walls 17. After the wood screw has been driven into a board or wall as far as the jaw members will allow, it can be released by a movement requiring the use of but one hand. The actuating screw 9 is brought into position resting in the palm of the hand with the fingers encircling the wooden handle 1. As the fingers rotate the wooden handle, the palm prevents the rotation of the actuating screw 9 and the spring 24 causes the jaws to separate as the cam follower back walls 17 ride up and over the recess cam portions 12. A new tool or wood screw can then be inserted with the other hand and the reverse action effected. Such a one-handed operation is in marked contrast to the conventional tool handle.

In accord with the objects of my invention, I have provided a pair of mated channel jaw members which define truncated pyramid shapes or truncated triangle cross sections in order to impart structural strength to the terminal ends thereof. Furthermore, I have formed this terminal end with a double taper so the jaws are self-centering and I have spring biased the jaw members to a release position to allow the interchange of tools with a one-hand operation. Each of these advantages is cumulative with every other advantage to gain consumer satisfaction and to add to the prestige of the manufacturer.

Figure 1:
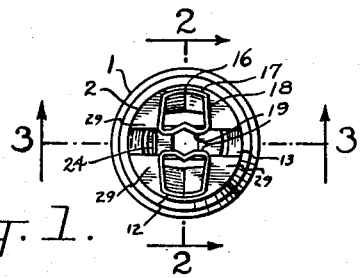
Fig. 1 is a plan view of my hollow handled tool holder showing the jaws thereof in the release position.
Figure 2:
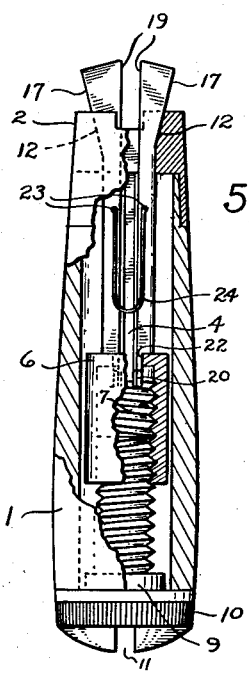
Fig. 2 is a side view, partially broken away and taken substantially on the line 2—2 of the Fig. 1, showing the correlated taper of the terminal ends of my jaw members and the tapered cam recess portions therefor.

One other important feature of my invention requires further explanation. As best shown in Figure 2, the ferrule 2 carries a shoulder 29 which protrudes into the interior of the hollow handle. This shoulder is formed in four quadrants (see Fig. 1) as a result of the right angle interception of the slots 13 and recess portions 12. Furthermore, as shown in Figure 2, the spring shanks 28 are elongated and protrude beyond the aligned holes 23 which pierce the channel flanges 14. Thus, when the actuating screw 9 is backed off allowing the spring 24 to separate the jaws, the outward movement of the channel sections causes the ends of each spring shank 28 to engage the under surface of the shoulder 29. This prevents the jaws from falling apart separately or together and, since the jaw movement is stopped, further rotation of the actuating screw 9 is of no effect. That is to say, further rotation will merely move the screw 9 longitudinally away from the wooden handle portion 1. The jaws, however, remain in an open position.

I have found this spring shank and shoulder engagement to be a definite improvement over the conventional tool handle because it prevents inadvertent detachment or loss of the jaw members. The average householder may be said to have a rather small amount of mechanical knowledge. Inadvertent detachment of the jaw members of the convention tool handle often strains this mechanical knowledge when a reassembly is attempted. As a result, the handle is laid to one side and is not used. This reflects upon the consumer good will of the manufacturer and is to be avoided. With my novel shank and shoulder arrangement, however, the jaws can be detached only by consciously and intentionally pinching them together to cause the spring shanks 28 to pass over the shoulder 29. Accordingly, inadvertent detachment is avoided and consumer good will is enhanced.

I claim:

1. In combination with a hollow tool handle including two cooperating jaw members movably mounted to grip objects therebetween, screw and cam means operatively engaging said jaw members selectively to move the same into grip and release positions, said jaw members terminating in hollow tubular portions projecting beyond the end of said handle whereby structural strength is imparted to that jaw portion subject to the most distortion and strain, said hollow portions being bounded across the backs thereof by sloping back cam follower faces and across the front faces thereof by substantially plane front gripping faces, said gripping faces being pierced by opposed openings spaced from the ends thereof and adapted to grip the head of a screw, or the like.

2. In a tool handle including two cooperating jaw members which are movably mounted to grip objects therebetween, the improvement comprising a polygonal hollow tubular portion defining the terminal end of each jaw member whereby structural strength is imparted to that portion of each jaw which is subject to the most distortion and strain, each said hollow portion having an exterior taper outline which is complementary to a taper outline defined by jaw receiving portions recessed within the end of said handle whereby said jaw members are self-centered when moved to grip objects therebetween.

3. Complementary jaw members for a tool handle, comprising elongated channel sections each including a web and carrying spaced flanges arranged to reinforce and extending the length of said jaw members, the portion of each flange which is adjacent the terminal end of each said channel section being elongated and being turned in laterally to abut the flange which is companion thereto along the margins thereof the elongated portions of the flanges on each jaw bounding, with said web, a hollow jaw section, the web of each channel section defining an elongated gripping face, and an opening piercing each gripping face and spaced from said terminal end, said opening being substantially rectangular in outline and extending laterally across said web for less than the full width thereof to receive and to grip the head of a screw, or the like.

4. Complementary jaw members for a tool handle, comprising channel sections each including a web and carrying spaced flanges arranged to reinforce the length of said jaw members, the terminal end of each said channel section having said flanges turned in to abut one another along the margins thereof and define, with said web, a hollow polygonal jaw section, each said hollow section being of truncated pyramid shape with tapered back and side walls to strengthen and guide said jaw members during operation, the web of each channel section defining an elongated gripping face, and a screw gripping opening piercing each gripping face at a point spaced from said terminal end.

5. A jaw member for a hollow tool handle, comprising a channel section including a web and having spaced flanges extending substantially the length thereof, said flanges being turned in to abut each other and define, with said web, a hollow section, said hollow section having tapered back and side walls defining a truncated pyramid shape, and an elongated gripping face carried by the web of said channel and pierced by an opening of substantial lateral width.

6. A hollow tool handle including two cooperating jaw members movably mounted to grip objects therebetween, comprising means engaging said jaw members to move the same, selectively, to grip and release positions, a shoulder carried adjacent the end of said hollow handle and protruding into the interior thereof, said jaw members being substantially channel-shaped and carrying the elongated terminal shanks of a U-shaped compression spring in the channel flanges to bias said jaw members to said release position, said spring shanks being arranged to protrude beyond said flanges and cooperate with said shoulder to retain said jaw members when moved to said release position.

7. In a hollow tool handle carrying two cooperating jaw members movably mounted to grip objects therebetween and having means engaging said jaw members to move the same, selectively, to grip and release positions, the improvement comprising; a pair of spaced shoulders carried adjacent the end of said hollow handle and protruding into the interior thereof, each said jaw member being substantially channel-shaped and carrying aligned openings in the channel flange portions medial the ends thereof, and a compression spring having elongated shanks engaging said alined openings to bias said jaw members to said release position, the length of each said spring shank exceeding the width of said channel and exceeding the spacing of said shoulders whereby the shank end protrudes for engagement with one of said shoulders.

8. In combination, a hollow tool handle operatively carrying a pair of channel-shaped cooperating jaw members each of which has two flange sections joined by a connecting web section, means mounting said jaw members for longitudinal and for lateral movement toward and away from one another to grip and release positions, respectively, each jaw member terminating in a four-sided hollow tubular head which is bounded by said channel shape on three sides and by a continuous back wall on the fourth side, the inner wall of a first end of said hollow tool handle carrying two opposed recess portions, each said recess portion being complementary in outline to a corresponding one of said hollow tubular heads and having a shoulder bounding each side thereof, and spring means engaging both jaw members below said tubular heads to bias the same toward said release position, the overall lateral width of said spring means exceeding the spacing of two of said shoulders so a portion of said spring means protrudes laterally beyond the side of at least one jaw member a distance sufficient to engage one of said shoulders and prevent the inadvertent loss of the jaw members.

References Cited in the file of this patent

UNITED STATES PATENTS

| Number | Name | Date |
|---|---|---|
| 207,620 | Parmelee | Sept. 3, 1878 |
| 323,727 | Peavey | Aug. 4, 1885 |
| 368,351 | Peavey | Aug. 16, 1887 |
| 936,644 | Leland | Oct. 12, 1909 |
| 967,837 | Schade | Aug. 16, 1910 |
| 978,208 | Reilly | Dec. 13, 1910 |
| 1,063,702 | Leland | June 3, 1913 |
| 1,593,908 | Miller | July 27, 1926 |
| 2,253,990 | Speed | Aug. 26, 1941 |
| 2,552,732 | Plante | May 15, 1951 |